US009369364B2

(12) United States Patent
Jaafar et al.

(10) Patent No.: US 9,369,364 B2
(45) Date of Patent: Jun. 14, 2016

(54) SYSTEM FOR ANALYSING NETWORK TRAFFIC AND A METHOD THEREOF

(71) Applicant: Telekom Malaysia Berhad, Kuala Lumpur (MX)

(72) Inventors: Mohd. Daud Jaafar, Seri Kembangan (MY); Azmirul Hamzah Nor Hamzah, Beranang (MY); Mohamad Suwandi Sidik, Puchong (MY); Rosmawati AB. Raub, Bandar Baru Bangi (MY); Faeizah Jusof, Puchong (MY); Ab. Aziz Harun, Kajang (MY)

(73) Assignee: TELEKOM MALAYSIA BERHAD, Kuala Lumpur (MY)

( * ) Notice: Subject to any disclaimer, the term of this patent is extended or adjusted under 35 U.S.C. 154(b) by 141 days.

(21) Appl. No.: 14/209,134

(22) Filed: Mar. 13, 2014

(65) Prior Publication Data

US 2014/0269339 A1    Sep. 18, 2014

(30) Foreign Application Priority Data

Mar. 13, 2013   (MY) .......................... PI 2013700402

(51) Int. Cl.
*H04L 12/26* (2006.01)
*H04L 12/24* (2006.01)

(52) U.S. Cl.
CPC ........ *H04L 43/0876* (2013.01); *H04L 41/0604* (2013.01); *H04L 41/069* (2013.01); *H04L 41/142* (2013.01)

(58) Field of Classification Search
None
See application file for complete search history.

(56) References Cited

U.S. PATENT DOCUMENTS

| | | | |
|---|---|---|---|
| 7,322,044 B2 * | 1/2008 | Hrastar ............... | H04L 41/0893 726/22 |
| 2005/0108377 A1 * | 5/2005 | Lee ..................... | H04L 63/1408 709/223 |
| 2010/0034109 A1 * | 2/2010 | Shomura ............... | H04L 41/142 370/252 |
| 2010/0138919 A1 * | 6/2010 | Peng ................. | H04L 29/12009 726/22 |
| 2010/0185760 A1 * | 7/2010 | Nakahira .............. | H04L 41/142 709/224 |

* cited by examiner

*Primary Examiner* — Jeffrey M Rutkowski
*Assistant Examiner* — Mohammed Rashid
(74) *Attorney, Agent, or Firm* — Jacobson Holman, PLLC.

(57) ABSTRACT

A method of analyzing network traffic comprising the steps of providing reference network traffic information associated with a remote access server and obtaining current network traffic information associated with the remote access server. Current network traffic information is analyzed using statistical analysis to determine whether values of the current network traffic information are within or outside a statistical range associated with the reference network traffic information. If a value of the current network traffic information is outside the statistical range, the value of the current network traffic information is an outlier which is included in an outlier information table, and an alert is generated. If a value of the current network traffic information is within the statistical range, a similarity value between the value of the current traffic information and outliers is determined. An action is then performed.

17 Claims, 3 Drawing Sheets

SYSTEM FOR ANALYSING NETWORK TRAFFIC AND A METHOD THEREOF

FIELD OF THE INVENTION

The present invention relates to a system for analysing network traffic and a method thereof. The present invention is particularly, although not exclusively, directed towards the detection of anomalous behaviour in network traffic, for example network traffic of a broadband remote access server (B-RAS) environment.

BACKGROUND OF THE INVENTION

Network traffic anomaly detection can be challenging, particularly as there is often no 'normal' network traffic data with which to compare the behaviour, and abnormal behaviour typically evolves over time.

SUMMARY OF THE INVENTION

In accordance with a first aspect of the present invention there is provided a method of analysing network traffic, the method comprising the steps of:
providing reference network traffic information associated with a remote access server;
obtaining current network traffic information associated with the remote access server;
analysing the current network traffic information using statistical analysis to determine whether values of the current network traffic information are within or outside a statistical range associated with the reference network traffic information;
performing an action based on the statistical analysis, wherein:
if a value of the current network traffic information is outside the statistical range, the value of the current network traffic information is determined to be an outlier, the outlier is included in an outlier information table, and an alert is generated, and
if a value of the current network traffic information is within the statistical range, a similarity value between the value of the current traffic information and outliers contained in the outlier information table is determined; and
performing an action based on the similarity value between the value of the current traffic information and the outliers, wherein:
if the similarity value is greater than or equal to a predetermined value, the corresponding outlier is removed from the outlier information table and the value of the current traffic information is included in the reference traffic information, and
if the similarity value is less than the predetermined value, the value of the current traffic information is included in the reference traffic information.
The method may further comprise the steps of:
determining a similarity value between the current network traffic information and the reference network traffic information; and
performing an action based on the similarity value between the current network traffic information and the reference network traffic information, wherein:
if the similarity value is greater than or equal to a predetermined value, the reference network traffic information is updated with the current network traffic information, and
if the similarity value is less than the predetermined value, the statistical analysis of the current network traffic information is performed.

In one embodiment, the statistical analysis comprises determining upper and lower boundaries associated with the reference network traffic information, the upper and lower boundaries being used to determine if a value of the current network traffic information is within or outside the statistical range. The upper and lower boundaries may be determined based on an inter quartile range (IQR) associated with the reference network traffic information.

The method may comprise updating the upper and lower boundaries based on the most recent reference network traffic information.

In one embodiment, the similarity values are determined using a distance-based analysis technique.

In one embodiment, the predetermined threshold of at least one similarity value is 95%.

In one embodiment, the method comprises the steps of:
obtaining historical network traffic information associated with the remote access server over a period of time;
determining a similarity value between the current network traffic information and the historical traffic information; and
generating the reference network traffic information based on the historical network traffic usage information and/or the current network traffic information if the similarity value between the current and historical network traffic information is greater than or equal to a predetermined threshold.

In one embodiment, the generated alert is communicated to an operator of the remote access server, such as a network administrator of the remote access server.

In one embodiment, the remote access server is a broadband remote access server (B-RAS).

In one embodiment, the current and reference network traffic information is based on at least one of the following network parameters associated with the remote access server: network traffic usage 'in' per port, network traffic usage 'out' per port, point to point protocol (PPP) sessions per port, utilisation ratio of total traffic 'in' per slot group, utilisation ratio of total traffic 'out' per slot group, and utilisation ratio of total traffic PPP sessions per slot.

In accordance with a second aspect of the present invention there is provided a network analysis system for analysing network traffic, the system comprising:
a data storage system that is arranged to store an outlier information table and reference network traffic information;
an anomaly detection system; and
an alert notification system; wherein
the anomaly detection system is arranged to:
receive current network traffic information associated with a remote access server and to receive reference network traffic information associated with the remote access server; and
analyse the current network traffic information using statistical analysis to determine whether values of the current network traffic information are within or outside a statistical range associated with the reference network traffic information; wherein the network analysis system is arranged to:
perform an action based on the statistical analysis, wherein:
if a value of the current network traffic information is outside the statistical range, the value of the current network traffic information is determined to be an outlier, the outlier is included in an outlier information table, and the alert notification system is arranged to generate an alert, and if a value of the current network traffic information is within the statistical range, a similarity value between the value of the current traffic information and outliers contained in the outlier information table is determined; and perform an action based on the similarity value between the value of the current traffic information and the outliers, wherein:

if the similarity value is greater than or equal to a predetermined value, the corresponding outlier is removed from the outlier information table and the value of the current traffic information is included in the reference traffic information, and if the similarity value is less than the predetermined value, the value of the current traffic information is included in the reference traffic information.

In one embodiment, the anomaly detection system is arranged to determine a similarity value between the current network traffic information and the reference network traffic information, and the network analysis system is arranged to:

perform an action based on the similarity value between the current network traffic information and the reference network traffic information, wherein:

if the similarity value is greater than or equal to a predetermined value, the reference network traffic information is updated with the current network traffic information, and if the similarity value is less than the predetermined value, the statistical analysis of the current network traffic information is performed.

In one embodiment, the anomaly detection system is arranged to perform a statistical analysis that comprises determining upper and lower boundaries associated with the reference network traffic information, the upper and lower boundaries being used to determine if a value of the current network traffic information is within or outside the statistical range. The upper and lower boundaries may be determined based on an inter quartile range (IQR) associated with the reference network traffic information.

The network analysis system may be arranged to update the upper and lower boundaries based on the most recent reference network traffic information.

In one embodiment, the network analysis system is arranged to determine similarity values using a distance-based analysis technique. The predetermined threshold of at least one similarity value may be 95%.

The network analysis system may further be arranged to:
receive historical network traffic information associated with the remote access server over a period of time;
determine a similarity value between the current network traffic information and the historical traffic information; and
generate the reference network traffic information based on the historical network traffic usage information and/or the current network traffic information if the similarity value between the current and historical network traffic information is greater than or equal to a predetermined threshold.

In one embodiment, the alert notification system is arranged to communicate the generated alert to an operator of the remote access server, such as a network administrator of the remote access server.

In one embodiment, the remote access server is a broadband remote access server (B-RAS).

In one embodiment, the current and reference network traffic information is based on at least one of the following network parameters associated with the remote access server: network traffic usage 'in' per port, network traffic usage 'out' per port, point to point protocol (PPP) sessions per port, utilisation ratio of total traffic 'in' per slot group, utilisation ratio of total traffic 'out' per slot group, and utilisation ratio of total traffic PPP sessions per slot.

In accordance with a third aspect of the present invention, there is provided a computer program arranged when loaded into a computing device to instruct the computing device to operate in accordance with the method of the first aspect of the present invention.

In accordance with a fourth aspect of the present invention, there is provided a computer readable medium having a computer readable program code embodied therein for causing a computing device to operate in accordance with the method of the first aspect of the present invention.

In accordance with a fifth aspect of the present invention, there is provided a data signal having a computer readable program code embodied therein to cause a computing device to operate in accordance with the method of the first aspect of the present invention.

BRIEF DESCRIPTION OF THE FIGURES

Embodiments of the present invention will now be described, by way of example only, with reference to the accompanying figures, in which.

DETAILED DESCRIPTION

Figure 1:
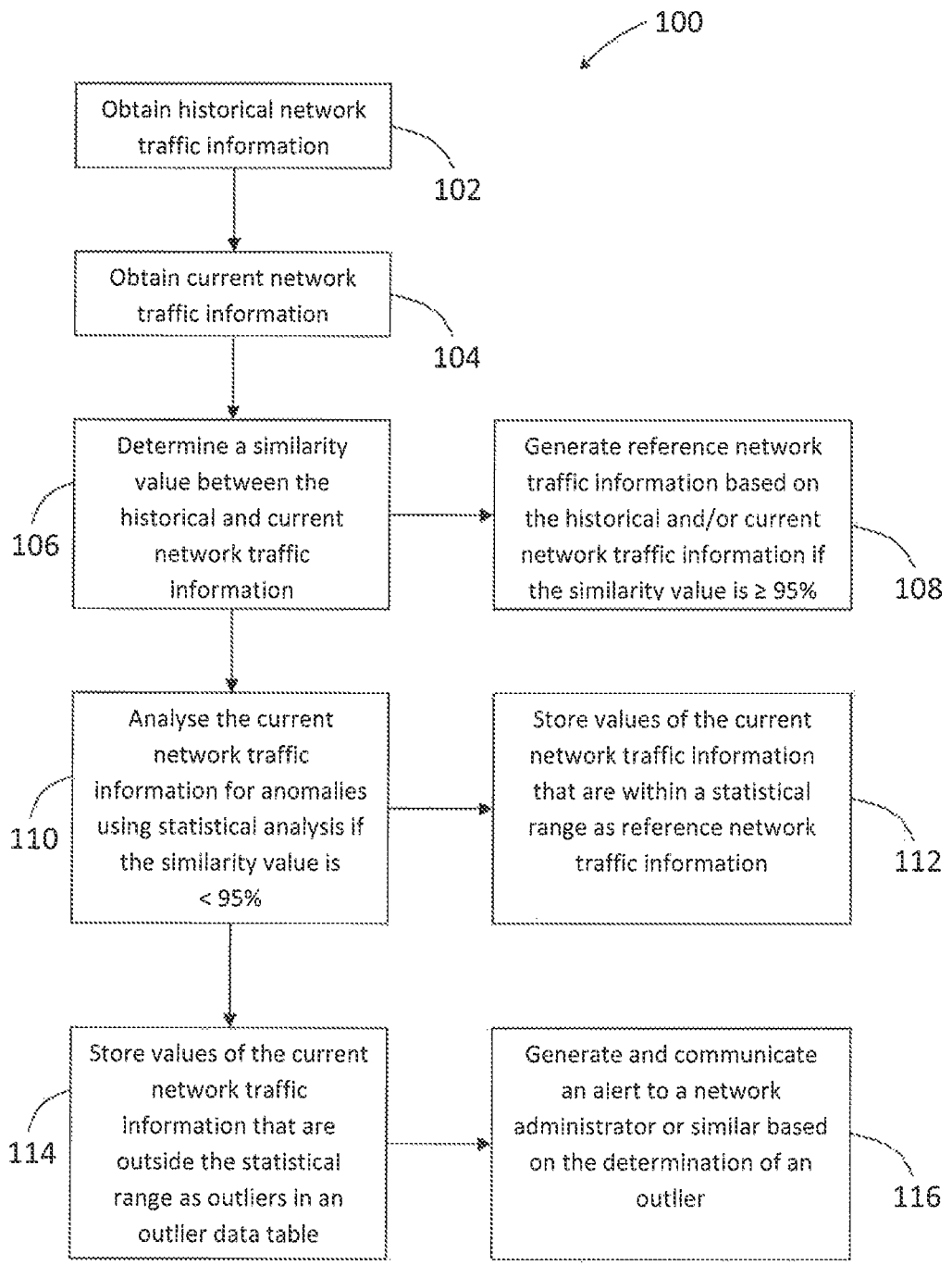
FIG. 1 is a flow diagram of a method of analysing network traffic in accordance with an embodiment of the present invention.
Figure 2:
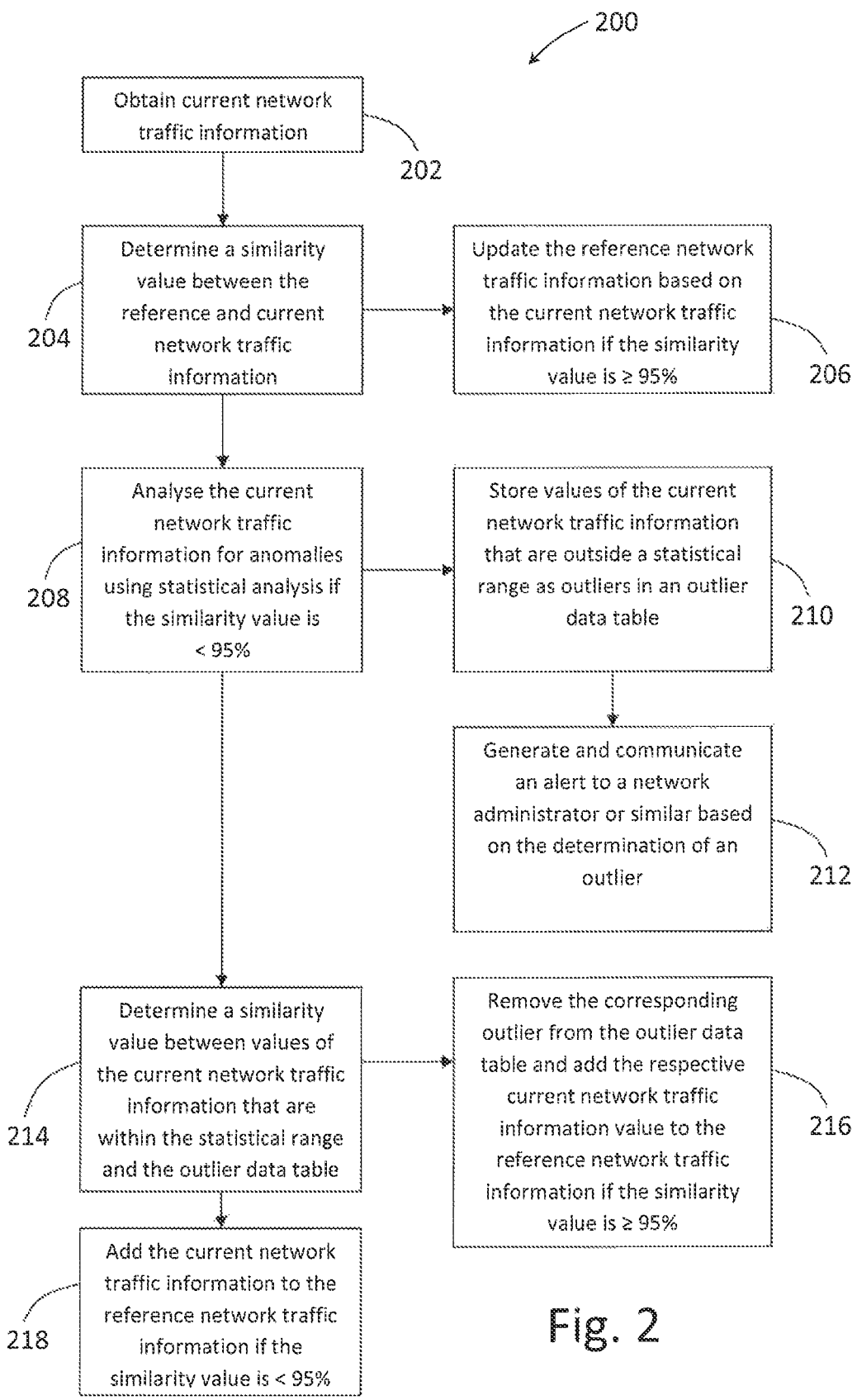
FIG. 2 is a flow diagram of a method of analysing network traffic in accordance with an embodiment of the present invention.

FIG. 1 shows a method 100 of analysing network traffic. In this example, network traffic associated with a broadband remote access server (B-RAS) is analysed so as to detect anomalies associated with the network traffic. Detecting anomalies facilitates notifying a relevant party, such as a network administrator associated with the B-RAS, that an anomaly has been detected, thereby enabling the relevant party to investigate the anomaly.

In a first step 102, historical network traffic information associated with the B-RAS is obtained over a period of time, for example over a month. The historical network traffic information can be considered to be 'unclean' information at this stage, as it would not be apparent whether the historical network traffic information contains any anomalies as there is nothing with which to compare it.

Network traffic information that is obtained from the B-RAS includes: network traffic usage 'in' per port, network traffic usage 'out' per port, point to point protocol (PPP) sessions per port, utilisation ratio of total traffic 'in' per slot group, utilisation ratio of total traffic 'out' per slot group, and utilisation ratio of total traffic PPP sessions per slot.

In a second step 104, current network traffic information associated with the B-RAS is obtained. In this example, the current network traffic information relates to network traffic usage associated with the current day. A similarity value between the current network traffic information and the historical network traffic information is determined in a third step 106. In this example, the similarity value is determined based on a distance-based analysis method, although it will be appreciated that the similarity value may be determined by any appropriate method that can be used to determine a similarity value between data sets.

In step 108, reference network traffic information is generated based on the determined similarity value. If the similarity value is greater than or equal to a predefined threshold, in this example a similarity value of 95%, then the current network traffic information is used to generate the reference network traffic information. In this example, the current network traffic information is stored as reference network traffic information in a normal usage table. The normal usage table forms part of a normal usage profile database that can be used for detecting anomalies.

It will be appreciated that either or both of the current and historical network traffic information can be used to generate the reference network traffic information due to their high level of similarity.

If the similarity value between the current and historical network traffic information is below the predefined threshold of 95%, then the current network traffic usage is analysed for anomalies using statistical analysis in a fifth step 110.

At this stage, as reference network traffic information has not yet been defined, the historical network traffic information can be analysed to determine appropriate statistical parameters with which to analyse the current network traffic information. In this example, the historical network traffic information is analysed to determine a first quartile (Q1), a third quartile (Q3) and an inter-quartile range (IQR). Q1, Q3 and the IQR are then used to determine upper and lower boundaries for use in identifying outliers in the current network traffic information. For example, the lower boundary may be defined by the equation Q1-1.5IQR, and the upper boundary may be defined by the equation Q3+1.5IQR.

The current network traffic information is then analysed and values that are found to fall within the lower and upper boundaries are considered to be representative of normal network traffic values and are stored in the normal usage table to form part of the reference network traffic information in step 112. The reference network traffic information can be analysed to determine a first quartile (Q1), third quartile (Q3) and an inter-quartile range (IQR) for use in calculating lower and upper boundaries. These boundary values can be used for future statistical analysis of current network traffic information.

Values of the current network traffic information that are below the lower boundary or above the upper boundary are identified as outliers in step 114. These values are stored in an outlier data table. Further, an alert is generated and communicated to a network administrator or similar associated with the B-RAS in step 116. The network administrator can then investigate the anomalous data that was identified as an outlier as appropriate.

Now that reference network traffic information has been defined, and some outliers have been identified, method 200 can be used to analyse daily network usage associated with the B-RAS. Although the following description refers to daily network usage, it will be appreciated that any appropriate period of network usage can be analysed.

Method 200 is similar to method 100, however now that reference network traffic information has been established, the method 200 can be used to identify further reference network traffic information from daily network usage. Further, now that some outliers have been identified, method 200 can be used to compare daily network usage that has been determined to be 'normal' with outliers that are stored in the outlier data table and, if they are found to be sufficiently similar, the relevant outlier can be removed from the outlier data table. That is, a previously identified outlier may not be defined as an outlier forever and, depending on network usage trends and anomaly detection methods that are used, the outlier may be removed from the outlier data table and added to the normal usage table.

In a first step 202 of method 200, current network traffic information is obtained. As explained above, the current network traffic information in this example corresponds to daily network usage associated with the B-RAS, however other appropriate time periods may be used.

In a second step 204, a similarity value between the current network traffic information and the reference network traffic information included in the normal usage table is determined. Similar to method 100, the similarity value is determined based on a distance-based analysis method, although it will be appreciated that the similarity value may be determined by any appropriate method that can be used to determine a similarity value between data sets.

In step 206, reference network traffic information is updated using the current network traffic information if the similarity value is greater than or equal to a predetermined threshold of 95%. The update is performed by adding the current network traffic information to the normal usage table.

If the similarity value is less than the predetermined threshold of 95%, then the current network traffic usage is analysed for anomalies using statistical analysis in step 208. The statistical analysis is based on the upper and lower boundaries that have been calculated based on the normal usage table.

In this particular example, the reference network traffic information is analysed to determine the first quartile (Q1), third quartile (Q3) and the inter-quartile range (IQR) for use in calculating lower and upper boundaries, wherein the lower boundary is defined by the equation Q1-1.5IQR, and the upper boundary is defined by the equation Q3+1.5IQR. The current network traffic information is analysed for values that fall within the lower and upper boundaries, and to identify values that fall outside these boundaries as per the example shown in FIG. 3.

Figure 3:
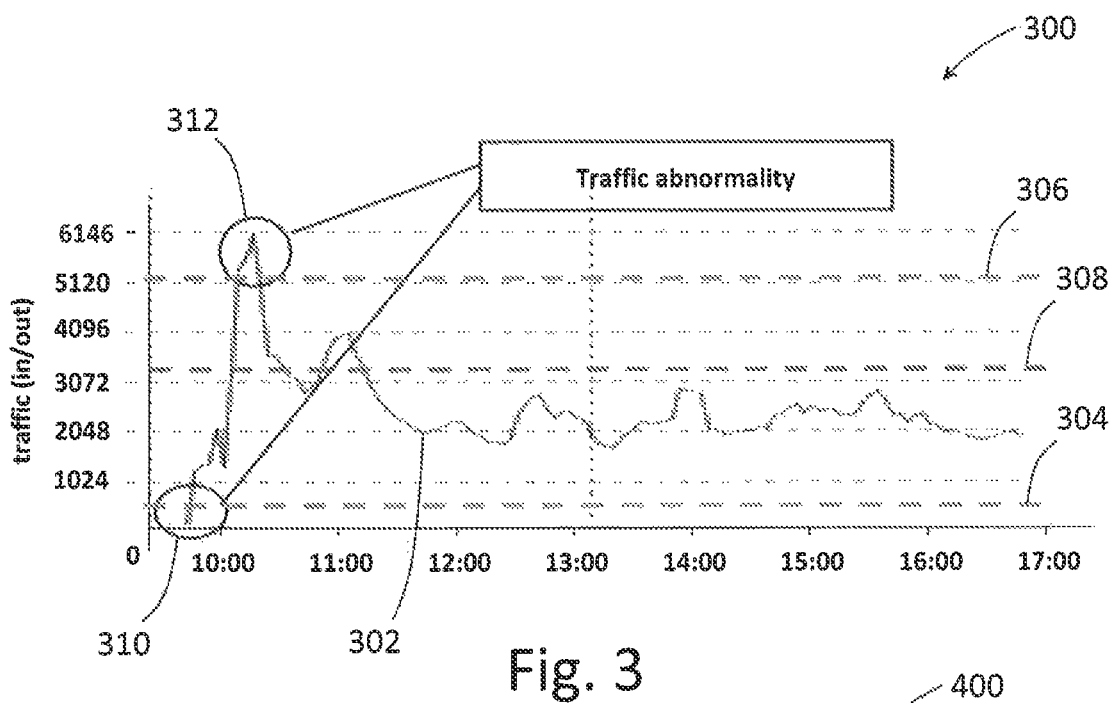
FIG. 3 is a graph illustrating an example statistical analysis that can be used in the methods of FIGS. 1 and 2.

FIG. 3 shows an example graph 300 of network traffic usage 302 'in' and 'out' per port over a period of time. Overlaid on the graph 300 are lower and upper boundaries 304, 306 that have been calculated using the reference network traffic information in accordance with the inter-quartile range method described above. The centre line 308 represents the median of the reference network traffic information. The majority of the current network traffic information falls within the lower and upper boundaries 304, 306, however first and second data portions 310, 312 are below the lower boundary 304 and above the upper boundary 306 respectively. The first and second data portions 310, 312 are therefore identified as outliers.

The current network traffic information is analysed and values that are below the lower boundary or that are above the upper boundary are identified as outliers in step 210. These values are stored in the outlier data table and an alert is generated and communicated to the network administrator associated with the B-RAS in step 212. As with method 100, the network administrator can then investigate the anomalous data that was identified as an outlier as appropriate.

For values of the current network traffic information that are determined to fall within the lower and upper boundaries, a similarity value between the current network traffic information values and the outlier data table is determined in step 214.

If the similarity value is greater than or equal to a predetermined threshold of 95%, the corresponding outlier is removed from the outlier data table and the respective current network traffic information value is added to the normal usage table in step 216.

If the similarity value is less than the predetermined threshold of 95%, the corresponding current network traffic information value is added to the normal usage table in step 218.

Figure 4:
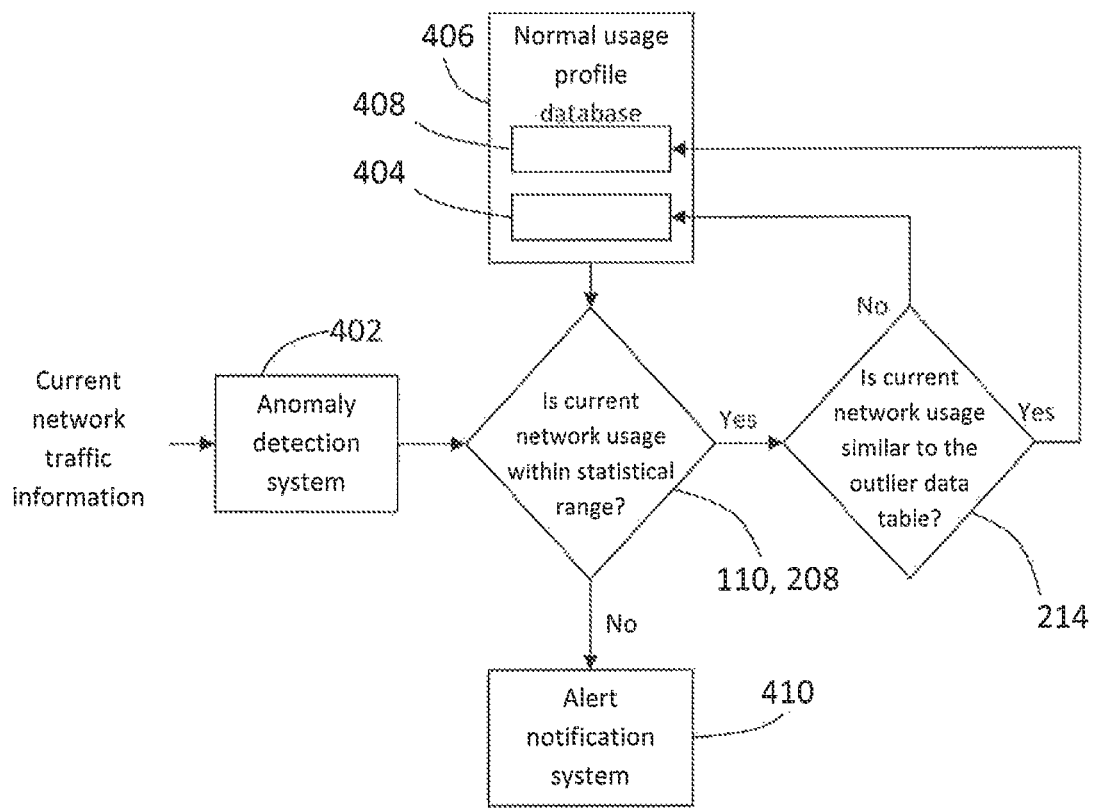
FIG. 4 is a schematic diagram of a network analysis system for implementing the methods of FIGS. 1 and 2.

The methods 100 and 200 are implemented by a network analysis system 400, shown in FIG. 4. The network analysis system 400 is implemented using a computing device, such as a personal or networked computer, that is in communication with the B-RAS. In this example, the computing device that is arranged to implement the network analysis system 400 is arranged to receive network information from the B-RAS including network traffic usage 'in' per port, network traffic usage 'out' per port, point to point protocol (PPP) sessions per port, utilisation ratio of total traffic 'in' per slot group, utilisation ratio of total traffic 'out' per slot group, and utilisation ratio of total traffic PPP sessions per slot.

Components of the network analysis system 400, such as anomaly detection system 402 that is described in more detail below, are implemented as software modules. It will be appreciated, however, that each component of the network analysis system 400 may be implemented as one or more dedicated hardware modules.

The current network traffic information is received by an anomaly detection system 402. The anomaly detection system 402 is arranged to determine the similarity value between the current network traffic information and the reference network traffic information (or the historical network traffic information if reference network traffic information has not yet been determined). If the current and reference network traffic information has a sufficiently high similarity value, greater than or equal to 95% in this example, then the current network traffic information is stored as reference network traffic information in a normal usage table 404 of a normal behaviour profile database 406.

If the current and reference network traffic information has a similarity value of less than 95%, then the current network traffic information is statistically analysed for anomalies as per steps 110, 208 of methods 100, 200.

To perform the statistical analysis, the anomaly detection system 402 determines Q1, Q3 and the IQR of the reference network traffic information and stores the values in the normal usage table 404. It will be appreciated that the network analysis system 400 can be arranged to calculate Q1, Q3 and the IQR of the reference network traffic information as needed, and that the Q1, Q3 and IQR values are calculated based on the most recent reference network traffic information.

The anomaly detection system 402 performs the statistical analysis of the current network traffic information and outliers that are identified in steps 110, 208 are stored in the outlier data table 408, which is part of the normal usage profile database 406.

Any alerts that are generated in response to determination of an outlier are generated and communicated to the network administrator by an alert notification system 410. The alert notification system 410 is therefore in communication with a computing and/or communications device associated with the network administrator.

In method 200, the step 214 of determining a similarity value between values of the current network traffic information that are within the statistical range and the outlier data table is performed by the anomaly detection system 402. It will be appreciated however that a separate and/or dedicated system or module can be used to determine similarities between the current network traffic information and the outlier data table.

In response to determining similarity values between the current network traffic information and the outlier data table, the anomaly detection system 402 either removes the corresponding outlier from the outlier data table and adds the respective current network traffic information value to the normal usage table for similarity values greater than or equal to 95%, or adds the current network traffic information value to the normal usage table for similarity values greater than 95%.

Numerous variations and modifications will suggest themselves to persons skilled in the relevant art, in addition to those already described, without departing from the basic inventive concepts. All such variations and modifications are to be considered within the scope of the present invention, the nature of which is to be determined from the foregoing description.

For example, it is envisaged that the methods 100, 200 or the system 400 may be implemented as a computer program that is arranged, when loaded into a computing device, to instruct the computing device to operate in accordance with the methods 100, 200 or the system 400.

Further, or alternatively, the methods 100, 200 or the system 400 may be provided in the form of a computer readable medium having a computer readable program code embodied therein for causing a computing device to operate in accordance with the methods 100, 200 or the system 400.

Still further, or alternatively, the methods 100, 200 or the system 400 may be provided in the form of a data signal having a computer readable program code embodied therein to cause a computing device to operate in accordance with the methods 100, 200 or the system 400.

In the description of the invention, except where the context requires otherwise due to express language or necessary implication, the words "comprise" or variations such as "comprises" or "comprising" are used in an inclusive sense, i.e. to specify the presence of the stated features, but not to preclude the presence or addition of further features in various embodiments of the invention.

The invention claimed is:

1. A method of analyzing network traffic, the method comprising the steps of:

providing reference network traffic information associated with a remote access server;

obtaining current network traffic information associated with the remote access server;

analyzing the current network traffic information using statistical analysis to determine whether values of the current network traffic information are within or outside a statistical range associated with the reference network traffic information;

performing an action based on the statistical analysis, wherein:

when a value of the current network traffic information is outside the statistical range, the value of the current network traffic information is determined to be an outlier, the outlier is included in an outlier information table, and an alert is generated, and when a value of the current network traffic information is within the statistical range, a similarity value between the value of the current traffic information and outliers contained in the outlier information table is determined; and performing an action based on the similarity value between the value of the current traffic information and the outliers, wherein:

when the similarity value is greater than or equal to a predetermined value, the corresponding outlier is removed from the outlier information table and the value of the current traffic information is included in the reference traffic information, and when the similarity value is less than the predetermined value, the value of the current traffic information is included in the reference traffic information;

wherein the predetermined threshold of at least one similarity value is 95%;

wherein the remote access server is a broadband remote access server (B-RAS); and wherein the current and reference network traffic information is based on the following network parameters associated with the remote access server: network traffic usage 'in' per port, network traffic usage 'out' per port, point to point protocol (PPP) sessions per port, utilization ratio of total traffic 'in' per slot group, utilization ratio of total traffic 'out' per slot group, and utilization ratio of total traffic PPP sessions per slot.

2. The method of claim 1, further comprising the steps of: determining a similarity value between the current network traffic information and the reference network traffic information; and performing an action based on the similarity value between the current network traffic information and the reference network traffic information, wherein:

when the similarity value is greater than or equal to a predetermined value, the reference network traffic information is updated with the current network traffic information, and when the similarity value is less than the predetermined value, the statistical analysis of the current network traffic information is performed.

3. The method of claim 1, wherein the statistical analysis comprises determining upper and lower boundaries associated with the reference network traffic information, the upper and lower boundaries being used to determine if a value of the current network traffic information is within or outside the statistical range.

4. The method of claim 3, wherein the upper and lower boundaries are determined based on an inter quartile range (IQR) associated with the reference network traffic information.

5. The method of claim 3, further comprising updating the upper and lower boundaries based on the most recent reference network traffic information.

6. The method of claim 1, wherein the similarity values are determined using a distance-based analysis technique.

7. The method of claim 1, further comprising the steps of: obtaining historical network traffic information associated with the remote access server over a period of time; determining a similarity value between the current network traffic information and the historical traffic information; and generating the reference network traffic information based on the historical network traffic usage information and/or the current network traffic information if the similarity value between the current and historical network traffic information is greater than or equal to a predetermined threshold.

8. The method of claim 1, wherein the generated alert is communicated to an operator of the remote access server.

9. A network analysis system for analyzing network traffic, the system comprising:

a data storage system that is arranged to store an outlier information table and reference network traffic information;

an anomaly detection system; and an alert notification system; wherein the anomaly detection system is arranged to:

receive current network traffic information associated with a remote access server and to receive reference network traffic information associated with the remote access server; and analyze the current network traffic information using statistical analysis to determine whether values of the current network traffic information are within or outside a statistical range associated with the reference network traffic information; wherein the network analysis system is arranged to:

perform an action based on the statistical analysis, wherein:

when a value of the current network traffic information is outside the statistical range, the value of the current network traffic information is determined to be an outlier, the outlier is included in an outlier information table, and the alert notification system is arranged to generate an alert, and when a value of the current network traffic information is within the statistical range, a similarity value between the value of the current traffic information and outliers contained in the outlier information table is determined; and perform an action based on the similarity value between the value of the current traffic information and the outliers, wherein:

when the similarity value is greater than or equal to a predetermined value, the corresponding outlier is removed from the outlier information table and the value of the current traffic information is included in the reference traffic information, and when the similarity value is less than the predetermined value, the value of the current traffic information is included in the reference traffic information;

wherein the predetermined threshold of at least one similarity value may be 95%;

wherein the remote access server is a broadband remote access server (B-RAS); and wherein the current and reference network traffic information is based on the following network parameters associated with the remote access server: network traffic usage 'in' per port, network traffic usage 'out' per port, point to point protocol (PPP) sessions per port, utilization ratio of total traffic 'in' per slot group, utilization ratio of total traffic 'out' per slot group, and utilization ratio of total traffic PPP sessions per slot.

10. The network analysis system of claim 9, wherein the anomaly detection system is arranged to determine a similarity value between the current network traffic information and the reference network traffic information, and the network analysis system is arranged to:

perform an action based on the similarity value between the current network traffic information and the reference network traffic information, wherein:

when the similarity value is greater than or equal to a predetermined value, the reference network traffic information is updated with the current network traffic information, and when the similarity value is less than the predetermined value, the statistical analysis of the current network traffic information is performed.

11. The network analysis system of claim 9, wherein the anomaly detection system is arranged to perform a statistical analysis that comprises determining upper and lower boundaries associated with the reference network traffic information, the upper and lower boundaries being used to determine if a value of the current network traffic information is within or outside the statistical range.

12. The network analysis system of claim 11, wherein the anomaly detection system is arranged to determine the upper and lower boundaries based on an inter quartile range (IQR) associated with the reference network traffic information.

13. The network analysis system of claim 11, further being arranged to update the upper and lower boundaries based on the most recent reference network traffic information.

14. The network analysis system of claim 9, further being arranged to determine similarity values using a distance-based analysis technique.

15. The network analysis system of claim 9, further being arranged to:
receive historical network traffic information associated with the remote access server over a period of time;
determine a similarity value between the current network traffic information and the historical traffic information; and
generate the reference network traffic information based on the historical network traffic usage information and/or the current network traffic information if the similarity value between the current and historical network traffic information is greater than or equal to a predetermined threshold.

16. The network analysis system of claim 9, wherein the alert notification system is arranged to communicate the generated alert to an operator of the remote access server.

17. A non-transitory computer readable medium having a computer readable program code embodied therein for causing a computing device to operate in accordance with a method comprising the steps of:
providing reference network traffic information associated with a remote access server;
obtaining current network traffic information associated with the remote access server;
analyzing the current network traffic information using statistical analysis to determine whether values of the current network traffic information are within or outside a statistical range associated with the reference network traffic information;
performing an action based on the statistical analysis, wherein:
when a value of the current network traffic information is outside the statistical range, the value of the current network traffic information is determined to be an outlier, the outlier is included in an outlier information table, and an alert is generated, and
when a value of the current network traffic information is within the statistical range, a similarity value between the value of the current traffic information and outliers contained in the outlier information table is determined; and
performing an action based on the similarity value between the value of the current traffic information and the outliers, wherein:
when the similarity value is greater than or equal to a predetermined value, the corresponding outlier is removed from the outlier information table and the value of the current traffic information is included in the reference traffic information, and
when the similarity value is less than the predetermined value, the value of the current traffic information is included in the reference traffic information;
wherein the predetermined threshold of at least one similarity value is 95%;
wherein the remote access server is a broadband remote access server (B-RAS); and
wherein the current and reference network traffic information is based on the following network parameters associated with the remote access server: network traffic usage 'in' per port, network traffic usage 'out' per port, point to point protocol (PPP) sessions per port, utilization ratio of total traffic 'in' per slot group, utilization ratio of total traffic 'out' per slot group, and utilization ratio of total traffic PPP sessions per slot.

* * * * *